Patented Apr. 28, 1931

1,803,219

UNITED STATES PATENT OFFICE

GIOVANNI TAGLIANI, OF BASEL, SWITZERLAND, ASSIGNOR TO CHEMICAL WORKS FORMERLY SANDOZ, OF BASEL, SWITZERLAND

PREPARATION OF STABLE ANTHRAQUINONE VAT DYES

No Drawing. Application filed October 6, 1928, Serial No. 310,912, and in Germany November 18, 1927.

The anthraquinone vat dyes as vatted according to the glucose-caustic soda reduction method are generally used for the continuous dyeing of printed reserve goods. Owing to the rapid dyeing operation, to the high temperatures of 80-85° C. usually employed and to the acid reacting reserves on the fabrics, the vats are much more subject to decomposition and reoxidation than is the case with other dyeing methods.

Now, it has been found that the stability of the glucose-caustic soda vats made from anthraquinone vat dyes can be increased by the addition to the vat of small quantities of aromatic hydroxy compounds and hydrogenated aromatic compounds. Such additions may consist of phenols and naphthols to which suitably a certain percentage (2–10%) of hydrogenated aromatic substances, such as cyclohexanols, methylcyclohexanols, hydrogenated derivatives of naphthalene or naphthols is admixed. By these admixtures the decomposition and reoxidation of the dyeing vats is prevented and leuco-compounds eventually set free are kept in solution or in a finely dispersed form.

Example

Indanthrene blue RS (colour index No. 1106) is reduced in a known manner according to the glucose-caustic soda method. To each litre of the dye vat there are added 2–5 ccm. of a solution prepared with 100 g. of a mixture of 92,5% of cresols and 7,5% of methylcyclohexanols and 1 litre of caustic soda of 30° Bé. A dye vat thus prepared can be used considerably longer and furnishes more level shades than would be the case without these admixtures. Moreover it can much rather be fully exhausted without trouble in the dyeing than the ordinary vats.

Instead of indanthrene blue RS, there may be employed in this example any other dyestuff of the anthraquinone series, such as indanthrene yellow GK (colour index No. 1132), duranthrene red BN (colour index No. 1162), cibanon blue 3G (colour index No. 1173) and cibanon brown B (colour index No. 1171).

What I claim is:
1. A process for increasing the stability of anthraquinone vat dyes, vatted according to the glucose-caustic soda reduction method, consisting in adding to the vat small quantities of phenolic bodies in mixture with hydrogenated aromatic compounds.
2. A process for increasing the stability of anthraquinone vat dyes, vatted according to the glucose-caustic soda reduction method, consisting in adding to the vat small quantities of mixtures of phenols and hydrogenated aromatic compounds.
3. A process for increasing the stability of anthraquinone vat dyes, vatted according to the glucose-caustic soda reduction method, consisting in adding to the vat small quantities of mixtures of phenols and hydrogenated phenols.
4. A process for increasing the stability of anthraquinone vat dyes, vatted according to the glucose-caustic soda reduction method, consisting in adding to the vat small quantities of mixtures of phenols and methylcyclohexanols.
5. A process for increasing the stability of anthraquinone vat dyes, vatted according to the glucose-caustic soda reduction method, consisting in adding to the vat small quantities of mixtures of cresols and methylcyclohexanols.
6. A process for increasing the stability of anthraquinone vat dyes, vatted according to the glucose-caustic soda reduction method, consisting in adding to the vat small quantities of mixtures containing 88–98% of cresols and 12–2% of methylcyclohexanols.
7. A process for increasing the stability of anthraquinone vat dyes, vatted according to the glucose-caustic soda reduction method, consisting in adding to the vat 0.01–0.5 per cent of mixtures containing 88–98% of cresols and 12–2% methylcyclohexanols.

In witness whereof I have hereunto signed my name this 24th day of September 1928.

GIOVANNI TAGLIANI.